Dec. 8, 1959   R. H. JOHNSON   2,916,333
BEARING WITH OIL RESERVOIR
Filed Aug. 9, 1956
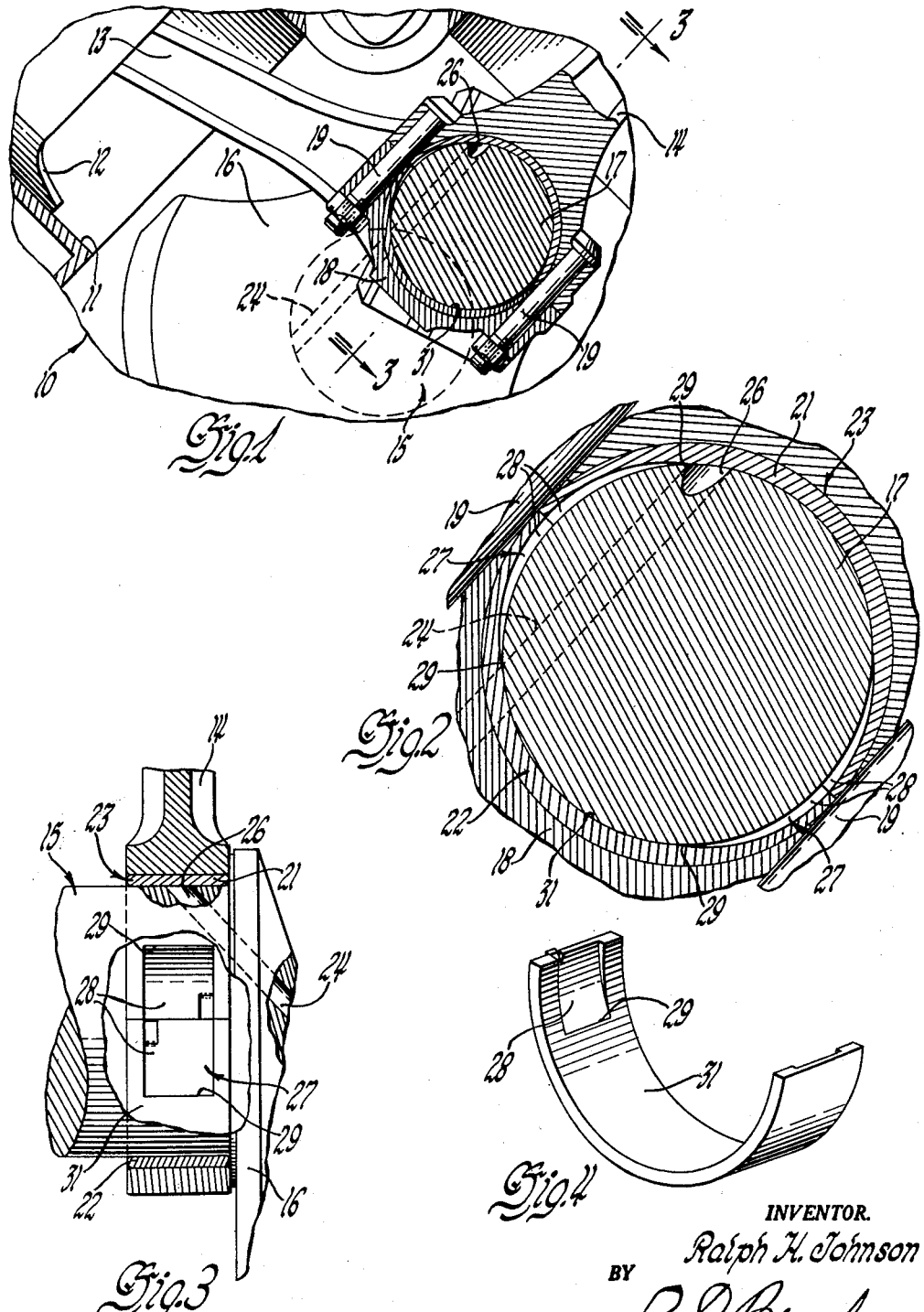
INVENTOR.
Ralph H. Johnson
BY
L. D. Burch
ATTORNEY.

United States Patent Office 2,916,333
Patented Dec. 8, 1959

2,916,333

BEARING WITH OIL RESERVOIR

Ralph H. Johnson, Detroit, Mich., assignor to General Motors Corporation, Detroit, Mich., a corporation of Delaware Application August 9, 1956, Serial No. 603,002

1 Claim. (Cl. 308—122)

This invention relates to bearings, especially applicable for use on the connecting rods of internal combustion engines, and has particular relation to means for increasing the unit loading on such bearing.

As the horsepower rating of internal combustion engines increases it becomes necessary either to increase the size of the bearings employed or to increase the unit loading on bearings of established size. It is sometimes possible to increase the unit loading by using improved materials or by improving the lubrication of the bearing surfaces. In the present instance it is proposed to accomplish this result by improving the lubrication and by increasing the bearing area in the places where the maximum loads are applied to the bearings, but without increasing the size of the bearings.

It has heretofore been the practice in construction of connecting rod bearings for internal combustion engines to provide an annular groove in the bearing surface, midway between the opposite ends of the bearing. This groove receives oil from a port in the journal, the port being rotatable with the journal to supply oil to the groove. Such grooves are sometimes made to extend throughout the circumferential extent of the bearing surface, sometimes throughout not more than one half the extent of such surface. In either event the groove decreases the bearing area and increases the unit loading on the bearing surfaces between the groove and the ends of the bearing.

It is now proposed to eliminate the grooving of the inner surface of the bearing in the areas where the greatest loads are applied to the bearing surface and to provide adjacent such areas one or more oil reservoirs through which the entire surface of the journal or other bearing member moves. When such reservoir means is supplied with oil under pressure the oil will adhere to the bearing surface traversing the reservoir and will be carried to the areas of the bearing where the unit loading is greatest. It is considered preferable to construct such reservoir means with tapering edges so that the effect of capillary attraction and interfacial tension will be applied to the bearing surfaces and the oil to provide a thicker and more substantial oil film in the areas where the unit loading is greatest.

In the drawing:

Figure 1 is a fragmentary cross sectional view of an internal combustion engine having a connecting rod bearing embracing the principles of the invention.

Figure 2 is an enlarged view of a connecting rod bearing embodied in the structure illustrated by Figure 1.

Figure 3 is a longitudinal section view of the bearing with parts of the crankshaft broken away, and taken substantially at the plane line of 3—3 of Figure 1.

Figure 4 is a perspective view of one of the bushings employed in the bearing illustrated by the preceding figures.

The engine 10 illustrated by Figure 1 is a V-type multiple cylinder internal combustion engine having cylinders 11 in which pistons 12 are reciprocated in accordance with the timed events of the engine. The pistons 12 are attached by connecting rods 13 and 14 to the crankshaft 15 of the engine 10. The crankshaft has arms 16 terminating in crank pins or journals 17 to which the connecting rods 13 and 14 are attached in pairs. Each of the connecting rods includes a bearing cap 18 which is fastened by bolts 19 in position to clamp the halves 21 and 22 of the bearing bushing 23 in the bearing end of the connecting rod. The bearing surface of the bushing 23 is adapted to operatively engage the bearing surface of the journal 17. Each of the crankarms 16 is provided with an oil passage 24 for each of the connecting rods of the engine. The oil passages 24 rotate with the crankarms 16 and supply oil for lubrication purposes through ports 26 which open through the journal surface substantially midway between the ends of each bearing sleeve or bushing 23. During the rotation of the crankshaft each of the ports 26 traverses the entire inner surface of each bushing for the purpose of supplying oil thereto. However, the clearance between the bearing surfaces of the journals and the bushings is small and in applications such as connecting rods of internal combustion engines the unit loading on the bearings is so high that the oil supplied to the bearing surfaces in this manner may not be sufficient. It is therefore proposed to provide one or more oil reservoirs 27 in the surface of one of the bearing members of each bearing. The reservoirs 27 may be formed in any suitable manner in the bearing surfaces, although in the present instances it is considered preferable to form the reservoirs in the bearing surfaces of the bushings 23 and on opposite sides of the bearing surfaces of the bushings 23. The reservoirs 27 are located at the sides of the connecting rods 13 and 14 and between the oppositely disposed bearing areas toward the ends of the connecting rods 13 and 14 and where the loading on the bearing surfaces is greatest. The loading will be greatest on the bearing surfaces of the connecting rods on the sides adjacent and more remote from the pistons 12, when the crankarms 16 are aligned with the connecting rods 13 and 14. In Figure 1 the crankarms 16 are shown as being aligned with the connecting rod 14 and the bearing surfaces where the greatest loads are applied to the connecting rod bearing surfaces and are between the reservoirs 27 and adjacent and remote from the cylinder. It is considered preferable to form the reservoirs 27 by forming oppositely tapering recesses 28 in one or more of the opposite ends of each of the halves 21 and 22 of the bushing 23. The recesses at the edges thereof remote from the ends of the bearing halves terminate at 29 in the bearing surfaces 31 on which the greatest loads are applied to each half of the connecting rod bearing. The arcuate extent of the reservoirs 27 preferably is about 90°. The arcuate extent of the bearing surfaces 31 where the greatest loads are applied also is about 90°. The bearing surfaces 31 are homogeneous and continuous. The slope of the inner surfaces forming the recesses 28 with respect to the opposed bearing surfaces of the journal 17 is such that the tapering edges of the reservoirs are extremely thin and of considerable extent lengthwise to provide reservoir ends of capillary dimensions. Under such circumstances the surface tension of the oil will cause the oil to be forced into the bearing surfaces by capillary attraction, particularly when the journal surface is rotating through one of the reservoirs and toward the bearing surface area therebeyond. The bushings 23 are formed to provide continuous and uninterrupted bearing areas between the reservoirs 27 which permits loading the bearing areas between the reservoirs to an extent far in excess of the possible bearing loading on bearings grooved in such areas. As the shaft 15 rotates the ports 26 will supply oil to the reservoirs 27 and the oil in the reservoirs will adhere by surface tension to the rotating surface of the journal and will be forced by capillary attraction beyond the narrow ends of the reservoirs and into the bearing areas where the loading on the connecting rods is greatest.

I claim:

A connecting rod or other bearing for internal combustion engines and the like and comprising, a bearing member and a journal member, said bearing member being adapted to have the principal loads thereon applied on spaced and oppositely disposed and circumferentially extending inner surface areas thereof, said bearing member being relieved between the ends thereof and between said areas to provide closed and oppositely disposed oil reservoir means extending circumferentially around the inner surface of said bearing member, said journal member between the ends of said bearing member being formed to provide an oil supply port traversing the inner surface of said bearing member and said reservoir means during the relative rotation of said journal member and said bearing member and supplying oil to said reservoir means, said areas of said bearing member being formed to provide homogeneous and continuous bearing surface means extending throughout the space between the ends of said reservoir means, said bearing member being formed between said reservoir means to prevent fluid communication between said reservoir means except through the spaces between the bearing surfaces of said members, said reservoir means being circumferentially tapered from the middle toward the ends thereof and terminating in edges that merge in the bearing surfaces of said bearing member and said journal member and beyond and toward which the surface of said journal member moves through said reservoir means.

References Cited in the file of this patent

UNITED STATES PATENTS

| 1,872,600 | Manning | Aug. 16, 1932 |

FOREIGN PATENTS

| 1,078,076 | France | May 5, 1954 |
| 1,111,415 | France | Oct. 26, 1955 |